United States Patent [19]

Ichikawa et al.

[11] 3,927,047

[45] Dec. 16, 1975

[54] NOVEL N-LONG CHAIN ACYL-ACIDIC AMINO ACID DIESTER

[75] Inventors: Tomomichi Ichikawa, Tokyo; Sigetosi Fukami, Shinza, both of Japan

[73] Assignees: Ajinomoto Co., Inc.; Nihon Emulsion Co., Inc., both of Tokyo, Japan

[22] Filed: Oct. 19, 1973

[21] Appl. No.: 407,813

[30] Foreign Application Priority Data
Oct. 23, 1972 Japan............................ 47-106018

[52] U.S. Cl............. 260/404; 260/482 P; 424/307; 424/313
[51] Int. Cl.²................................... C07C 101/22
[58] Field of Search ...................... 260/404, 482 P

[56] References Cited
UNITED STATES PATENTS
2,463,779  3/1949  Kester............................ 260/404
2,909,535  10/1959  Jungermann...................... 260/404

FOREIGN PATENTS OR APPLICATIONS
2,021,825  12/1971  Germany........................ 260/482 P OTHER PUBLICATIONS
Senoh et al., Chem. AB., Vol. 63 (1965), p. 13411c.
Uchio et al., Chem. Ab., Vol. 64 (1966), p. 11314c.
Seiyaku et al., Chem. Ab., Vol. 74 (1971), 54175g.

Primary Examiner—Patrick P. Garvin
Attorney, Agent, or Firm—Sherman & Shalloway

[57] ABSTRACT

N-long chain acyl-acidic glutamic or aspartic acid diesters having an acyl group of 8–22 carbon atoms, the ester part of which is derived from an alcohol selected from the group of higher alcohols, polyoxyalkylene higher alcohol ethers and polyalkyleneglycol higher fatty acid monoesters. These diesters are useful as oil-soluble non-ionic surfactants.

28 Claims, No Drawings

NOVEL N-LONG CHAIN ACYL-ACIDIC AMINO ACID DIESTER

This invention relates to novel N-long chain acylacidic amino acid diesters and to cosmetics containing said diesters.

Acidic alkali salts of N-long chain acylglutamic acid are known. These compounds are water-soluble substances having surface activity, and have a wide range of utility. Because of low toxicity, reduced skin irritation and good biodegradability, they have attracted attention as hazardfree anionic surfactants. These N-long chain acyl-acidic amino acid salts, however, are difficult to solubilize in oils and fats, and when used as surfactants for skin cosmetics which are emulsified products or soluble products containing oil, they are limited in the amount to be used because the dispersion stability of the emulsified and soluble products is rather poor. Consequently, the effects of these compounds are not sufficiently exhibited.

Accordingly, an object of this invention is to provide novel N-long chain acyl-acidic amino acid derivatives having improved solubility in oils.

Another object of this invention is to provide an oil-soluble surface active agent having low toxicity, reduced skin irritation, and good biodegradability.

Still another object of this invention is to provide cosmetics having good emulsification stability and solubilization stability.

According to this invention, there is provided an N-long chain acyl-acidic amino acid diester of the general formula

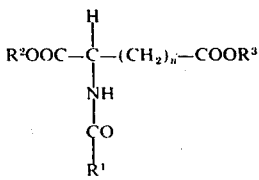

wherein $R^1CO-$ is a residue of a straight-chain or branched-chain saturated or unsaturated aliphatic acid having 7 to 21 carbon atoms; $R^2O$ and $R^3O$ are a residue of a straight-chain or branched-chain saturated or unsaturated aliphatic alcohol having 8 to 30 carbon atoms, a residue of a polyoxyalkylene higher alcohol ether composed of a straight-chain or branched-shain saturated or unsaturated monohydric alcohol having 8 to 30 carbon atoms and a polyoxyalkylene containing 1 to 20 oxyalkylene units with 2 to 4 carbon atoms, or a residue of a polyoxyalkylene higher fatty acid ester composed of a straight-chain or branched-chain saturated or unsaturated monovalent aliphatic acid and a polyoxyalkylene containing 1 to 20 polyoxyalkylene units with 2 to 4 carbon atoms; and $n$ is 1 or 2.

These diesters are novel, oil-soluble non-ionic surface active compounds which have not reported in the literature. Since they are well soluble in oils and retain the above-described desirable characteristics of the N-long chain acyl-acidic amino acid salts, they are suitable for use as oil-soluble surfactants in the fields of cosmetics and perfumes.

The oil-soluble non-ionic surface active agents in accordance with this invention undergo little change with passage of time when used for skin cosmetics, and even when stored for prolonged periods of time, they do not cause coloration, offensive odor or degeneration. They have very superior properties such as spreadability, and emollientness and give emulsified products of superior luster and milky whiteness.

When used as a material for an oil phase of a hair dressing cosmetic, they exhibit excellent hair dressing effect and give soft feeling and luster to the hair.

Furthermore, since they markedly improve the dispersibility of freon gas, they can be used to give a variety of aerosol products of homogeneous liquid phase.

If these compounds are added to shampoos or soaps, there can be obtained products which cause reduced skin roughening.

The diesters of this invention which contain a polyoxyalkylene group in the diester portion namely, polyoxyalkylene higher alcohol ethers or polyoxyalkylene glycol higher fatty acid monoesters of the N-long chain aliphatic acid acyl-acidic amino acids, are especially preferred since they have superior emulsification stability in water as compared with the polyoxyalkylene group-free diesters of this invention, namely, higher alcohol diesters of the N-long chain fatty acid acyl-acidic amino acids, and can be used for a wider variety of cosmetics.

The esterification products formed with polyoxyalkylene higher alcohol ethers are superior as water-repellents, lubricants or lusterants, and find a wider range of utility.

The N-long chain fatty acid acyl-acidic amino acid diester of this invention is added to cosmetics in an amount of 1 to 30% based on the total weight of the formulated cosmetics. The preferred amount varies considerably according to the intended use of the resulting cosmetics, and is 5 to 20% for creams and 1 to 10% for lotions.

The non-ionic surface active compounds of this invention can be prepared by reacting N-long chain acyl-acidic amino acids with higher alcohols, polyoxyalkylene higher alcohol ethers or polyalkylene glycol higher fatty acid monoesters by a known esterification method such as dehydrocondensation by heating at atmospheric or reduced pressure, ester-interchange reaction, or azeotropic dehydrocondensation. The azeotropic dehydrocondensation reaction is most suitable in view of the reaction conditions, and the yield and purity of the product.

For instance, the azeotropic dehydrocondensation is suitably carried out under the following conditions. A reactor is charged with 1 mol of the N-long chain acyl-acidic amino acid, 2.0 to 2.2 mols of the higher alcohol, polyoxyalkylene higher alcohol ether or polyalkylene higher fatty acid monoester, and 10 to 50% (% by volume based on the amount of the N-long chain acyl-acidic amino acid and the alcohol) of a non-polar solvent such as benzene or toluene, and after thorough mixing with stirring, 0.01 to 1.5 mols of an acid catalyst is added. The mixture is heated with stirring for 1 to 10 hours at 70° to 200°C. Water generated as by-product in this reaction is removed as much as possible to promote the reaction.

Other methods can also be employed in producing the non-ionic surface active compounds of this invention. For example, N-long chain acyl-acidic amino diesters can be prepared by the Schotten-Baumann reaction whereby an acidic amino acid is reacted with an alcohol in the presence of an acidic catalyst to form a corresponding acidic amino acid diester, and then the diester obtained is reacted with a long chain fatty acid halide in the presence of an alkali catalyst.

The N-long chain acyl-acidic amino acid diesters synthesized by such a method as described above are available in a variety of grades ranging from liquid to solid with low to high viscosity and small to large H.L.B. values, according to the type of the acyl group, the type of the alkyl group of the higher alcohol, polyoxyalkylene higher alcohol ethers or polyalkylene glycol higher fatty acid monoester, and the number of mols of the polyoxyalkylene added.

The N-long chain acyl-acidic amino acid portion of the diester of this invention consists of N-long chain acyl-aspartic acid and N-long chain acylglutamic acid. The long chain acyl group may be those derived from saturated or unsaturated fatty acids having 8 to 22 carbon atoms, such as lauric acid, palmitic acid, stearic acid or oleic acid, or those derived from naturally occurring mixed fatty acids such as coconut oil fatty acid, beef tallow fatty acid or hardened beef tallow fatty acid, or fatty acids (including branched fatty acids) obtainable by snythesis. The acidic amino acid component may be either an optically active compound or a racemic modification.

The alcohol component to be used for esterifying the N-long chain acylglutamic acid or aspartic acid is selected from higher alcohols, polyoxyalkylene higher alcohol ethers and polyalkylene glycol higher fatty acid monoesters. The higher alcohols may be natural or synthetic aliphatic alcohols having 8 to 30 carbon atoms, examples of which are straight-chain alcohols such as lauryl alcohol, myristyl alcohol, cetyl alcohol or stearyl alcohol, or branched-chain alcohols such as 2-hexyldecyl alcohol or 2-octyldodecyl alcohol. Oleyl alcohol can be used as an unsaturated alcohol.

Examples of the polyoxyalkylene higher alcohol ether are polyoxyethylene higher alcohol ethers, polyoxypropylene higher alcohol ethers, polyoxybutylene higher alcohol ethers, or polyoxyethylene-polyoxypropylene copolymer higher alcohol ethers. The higher alcohol moiety of these ethers may be those having 8 to 30 carbon atoms. The suitable number of mols of the oxyalkylene to be added is 1 to 20 mols.

The polyalkylene glycol higher fatty acid monoesters may be polyethylene glycol higher fatty acid monoesters, polypropylene glycol higher fatty acid monoesters, polybutylene glycol higher fatty acid monoesters, and polyethylene glycol-polypropylene glycol higher fatty acid monoesters. The higher fatty acid components may be those saturated or unsaturated and having 8 to 22 carbon atoms. Examples of the acidic catalyst used for the esterification reaction are sulfuric acid, p-toluenesulfonic acid, hydrogen chloride, and strongly acidic ion-exchange resins.

The N-long chain acyl-acidic amino acid diesters of this invention cause hardly any toxicity and skin irritation, and are very stable. Furthermore, since these compounds give suppleness, smoothness and emollientness to the skin and hair, they are especially useful as oil-soluble surface active agents for use in perfumes and cosmetics.

The following examples illustrate the present invention more specifically. The physical properties, H.L.B. value, solubility and emulsifying power of the N-long chain fatty acid acyl-acidic amino acid diesters of this invention were measured by the following methods.

1. ACID VALUE

This is the amount in milligrams of potassium hydroxide (KOH) required to neutralize one gram of the sample. The sample (1 to 2 gr.) is dissolved in 50 ml. of a mixture of equal amounts of ethanol and ether, and several drops of phenolphthalein were added. The solution was titrated with a 0.1N potassium hydroxide/ethanol solution until it assumes a light red color continously for 30 seconds. The acid value is calculated as follows:

$$\text{Acid value} = \frac{\text{Amount of the 0.1N KOH/ethanol solution in milliliters} \times 5.611}{\text{Amount of the sample in grams}}$$

2. SAPONIFICATION VALUE

This is the amount of potassium hydroxide in milligrams required to saponify the ester in one gram of the sample and neutralize the free acid in the sample. The sample (1 to 2 gr.) is added to 25 ml. of a 0.5N potassium hydroxide/ethanol solution, and the mixture is heated gently for one hour. After cooling, an excessive amount of the potassium hydroxide is titrated with 0.5N hydrochloric acid. When turbidity occurs in the solution after cooling, the titration is carried out with warming. A blank test is carried out by the same procedure. The saponification value is calculated as follows:

$$\text{Saponification value} = \frac{(a-b) \times 28.05}{\text{Amount of the sample in grams}}$$

wherein $a$ is the amount in milliliters of 0.5N hydrochloric acid in the blank test, and $b$ is the amount in milliliters of 0.5N hydrochloric acid in the test using the sample, with the proviso that the amount of the sample is adjusted so that $a - b$ is less than 10 ml.

3. COAGULATION POINT

The sample is melted and placed in a test tube to the height of the indicator line. A thermometer is inserted into the center of the test tube with the lower end of the mercury bulb situated 10 mm above the bottom of the test tube. A stirring rod is also inserted in the test tube. Water or ice water is placed in a beaker, and the temperature is adjusted to a point 10° to 15°C. lower than the coagulating point. When the temperature stops falling for 30 seconds or rises within 30 seconds, the stirring rod is withdrawn from the sample in the test tube, and the test tube is allowed to stand. The maximum temperature attained by the temperature rise that occurs immediately after the test tube has been allowed to stand is defined as the coagulating point of the sample.

4. SPECIFIC GRAVITY

The measurement is made using a pycnometer.

5. H.L.B. VALUE

Calculated in accordance with the following equation.

$$H.L.B. = 7 + 11.7 \log \frac{M_w}{M_o}$$

wherein $M_w$ is the molecular weight of the hydrophilic group, and $M_o$ is the molecular weight of the oleophilic group.

7. SOLUBILITY 98 g of each of the solvents shown in table 2 and 2.0 g of each of the N-long chain acylamino acid diesters shown in Table 2 were placed in a 100 ml. beaker, and they were heated to 60°C. with stirring, and then the mixture was allowed to stand and cooled. The dissolved state at 40°C. was observed.

8. EMULSIFICATION POWER 10 ml. of ion-exchanged water and 10 ml. of a 0.2% toluene solution of each of the N-long chain acylamino acid diester were placed in a measuring test tube, and the test tube was repeatedly turned upside down 30 times at 40°C. to emulsify the contents. Twenty minutes later, the volume of the aqueous phase separated was measured.

The following Examples 1 to 28 illustrate the preparation of the N-long chain acyl-acidic amino acid diesters of the invention.

EXAMPLE 1

Synthesis of N-coconut oil fatty acid acyl-L-glutamic acid 2-hexyldecyl diester:

A reactor was charged with 1 mol of N-coconut oil fatty acid acylglutamic acid, 2.1 mols of 2-hexyldecyl alcohol and 240 ml. of benzene as a solvent, and after thorough mixing with stirring, 0.015 mol of sulfuric acid as a catalyst was added. The mixture was heated with stirring for about 3 hours at 80°C. to 120°C. The water generated as a by-product was completely removed during the reaction. After the reaction, the product was neutralized with an aqueous solution of sodium hydroxide, and the benzene was recovered to afford N-coconut oil fatty acid acyl-L-glutamic acid 2-hexyldecyl diester in a yield of 98.5%, which had a specific gravity [$D_{20}^{30}$] of 0.90, an acid value of 1.23, a saponification value of 137.23, and a pH (1.0%) of 5.7.

EXAMPLE 2

Synthesis of N-coconut oil fatty acid acyl-L-glutamic acid polyoxyethylene (2 mols) oleyl ether diester:

A reactor was charged with 1 mol of N-coconut oil fatty acid acyl-L-glutamic acid, 2.2 mols of polyoxyethylene (2 mols) oleyl alcohol ether, and 450 ml. of benzene as a solvent. After thorough mixing with stirring, 0.03 mol of para-toluenesulfonic acid was added as a catalyst, and the mixture was heated with stirring for about 2 hours at 90°C. to 150°C. The water generated as a by-product was completely removed during the reaction. After the reaction, the product was neutralized with an aqueous solution of sodium hydroxide, and the benzene was recovered to afford N-coconut oil fatty acid acyl-L-glutamic acid polyoxyethylene (2 mols) oleyl diester in a yield of 98.7%, which had a specific gravity [$D_{20}^{30}$] of 0.92, an acid value of 1.03, a saponification value of 107.26, and a pH (1.0%) of 6.20.

EXAMPLE 3

Synthesis of N-coconut oil fatty acid acyl-L-glutamic acid polyoxyethylene (2 mols) oleic acid monoester-diester:

A reactor was charged with 1 mol of N-coconut oil fatty acid acyl-L-gluatmic acid, 2.0 mols of polyoxyethylene (2 mols) oleic acid monoester and 500 ml. of benzene as a solvent. After thorough mixing with stirring, 0.015 mol of sulfuric acid was added as a catalyst. The water generated as a by-product was completely removed during the reaction. After the reaction, the product was washed with water three or four times in order to remove the sulfuric acid catalyst. The benzene was recovered, and N-coconut oil fatty acid acyl-L-glutamic acid polyoxyethylene (2 mols) oleic acid monoester diester was obtained in a yield of 98.0%. This product had a specific gravity [$D_{20}^{30}$] of 0.98, an acid value of 0.12, a saponification value of 168.58 and a pH (1.0%) of 6.30.

EXAMPLE 4 to 28

The procedure of example 1 was repeated except that each of the amino acid components and each of the alcohol components shown in table 1 were used together with varying amounts of sulfuric acid as a catalyst. The yield, physical properties and H.L.B. value of the resulting diesters are shown in table 1.

The solubilities of the diesters obtained are shown in table 2, and their emulsifying power, in table 3.

Table 1

| Examples | N-long chain acyl amino acid | Alcohols Type | Amount (mols) | Amount of $H_2SO_4$ as catalyst (mols) | Products | Yield to product (%) |
|---|---|---|---|---|---|---|
| 4 | LA | cetyl alcohol | 2.05 | 0.05 | LA-cetyl diester | 98.0 |
| 5 | LA | 2-hexyldecyl alcohol | " | " | LA-2-hexyldecyl diester | 99.0 |
| 6 | LA | 2-octyldodecyl alcohol | " | " | LA-2-octyldodecyl diester | 99.2 |
| 7 | LA | stearyl alcohol | " | " | LA-stearyl diester | 98.7 |
| 8 | CA | cetyl alcohol | " | " | CA-cetyl diester | 98.5 |
| 1 | CA | 2-hexyldecyl alcohol | " | " | CA-2-hexyldecyl diester | 99.0 |
| 9 | CA | 2-octyldodecyl alcohol | " | " | CA-2-octyldodecyl diester | 99.0 |
| 10 | CA | stearyl alcohol | " | " | CA-stearyl diester | 98.2 |
| 11 | CA | isostearyl alcohol | " | " | CA-isostearyl diester | 99.0 |
| 12 | CA | oleyl alcohol | " | " | CA-oleyl diester | 99.3 |
| 13 | HA | isostearyl alcohol | " | " | HA-isostearyl diester | 99.0 |
| 14 | LA | P.O.E. (2 mols) cetyl alcohol ether | " | 0.07 | LA-P.O.E. (2 mols) cetyl ether diester | 98.5 |
| 15 | LA | P.O.E. (5 mols) cetyl alcohol ether | " | 0.085 | LA-P.O.E. (5 mols) cetyl ether diester | 98.6 |
| 16 | LA | P.O.E. (2 mols) stearyl alcohol ether | " | 0.07 | LA-P.O.E. (2 mols) stearyl ether diester | 98.5 |
| 17 | LA | P.O.E. (5 mols) stearyl alcohol ether | " | 0.085 | LA-P.O.E. (5 mols) stearyl ether diester | 98.7 |

Table 1-continued

Physical properties of the products

| Examples | Saponification value | Acid value | Specific gravity ($D_{20}^{30}$) | Coagulation point (°C.) | pH | H.L.B. |
|---|---|---|---|---|---|---|
| 4 | 132.57 | 3.02 | 0.87* | 64.1 | 6.2 | 0.65 |
| 5 | 132.45 | 2.15 | 0.90 | 0.5 | 5.8 | 0.7 |
| 6 | 120.60 | 2.30 | 0.89 | 1.5 | 6.0 | 0.15 |
| 7 | 127.10 | 2.15 | 0.86* | 65.0 | 5.7 | 0.4 |
| 8 | 134.62 | 1.50 | 0.87* | 60.8 | 5.8 | 0.65 |
| 1 | 137.23 | 1.80 | 0.91 | −0.8 | 5.7 | 0.7 |
| 9 | 115.81 | 2.30 | 0.89 | 0.7 | 5.8 | 0.15 |
| 10 | 127.86 | 2.50 | 0.86* | 63.5 | 6.2 | 0.4 |
| 11 | 126.13 | 2.35 | 0.90 | −3.5 | 6.1 | 0.47 |
| 12 | 127.77 | 1.85 | 0.91 | 22.0 | 6.0 | 0.45 |
| 13 | 113.19 | 1.76 | 0.90 | −1.2 | 6.3 | 0.35 |
| 14 | 113.86 | 1.03 | 0.91* | 46.0 | 5.6 | 2.4 |
| 15 | 89.79 | 2.03 | 0.95* | 38.5 | 5.8 | 6.0 |
| 16 | 111.00 | 1.75 | 0.90* | 48.7 | 6.0 | 2.1 |
| 17 | 88.03 | 2.14 | 0.94* | 46.0 | 6.1 | 5.5 |

| Examples | N-long chain acyl amino acid | Alcohols Type | Amount (mols) | Amount of $H_2SO_4$ as catalyst (mols) | Products | Yield to product (%) |
|---|---|---|---|---|---|---|
| 18 | LA | P.O.E. (2 mols) 2-hexyldecyl alcohol ether | 2 | 0.07 | LA-P.O.E. (2 mols) 2-hexyldecyl ether diester | 99.0 |
| 19 | LA | P.O.E. (5 mols) 2-hexyldecyl alcohol ether | " | 0.085 | LA-P.O.E. (5 mols) 2-hexyldecyl ether diester | 98.7 |
| 20 | LA | P.O.E. (10 mols) 2-hexyldecyl alcohol ether | " | 0.13 | LA-P.O.E. (10 mols) 2-hexyldecyl ether diester | 98.7 |
| 21 | LA | P.O.E. (10 mols) oleyl alcohol ether | " | 0.13 | LA-P.O.E. (10 mols) oleyl ether diester | 99.0 |
| 2 | CA | P.O.E. (2 mols) oleyl alcohol ether | " | 0.07 | CA-P.O.E. (2 mols) oleyl ether diester | 99.2 |
| 22 | CA | P.O.E. (5 mols) oleyl alcohol ether | " | 0.085 | CA-P.O.E. (5 mols) oleyl ether diester | 99.0 |
| 23 | CA | P.O.E. (10 mols) oleyl alcohol ether | " | 0.13 | CA-P.O.E. (10 mols) oleyl ether diester | 99.0 |
| 24 | CA | P.O.E. (15 mols) oleyl alcohol ether | " | 0.19 | CA-P.O.E. (15 mols) oleyl ether diester | 98.5 |
| 25 | CA | P.O.P. (3 mols) oleyl alcohol ether | " | 0.07 | CA-P.O.P. (3 mols) oleyl ether diester | 99.5 |
| 3 | CA | P.O.E. (2 mols) oleic acid monoester | " | " | CA-P.O.E. (2 mols) oleic acid monoester diester | 98.0 |
| 26 | CA | P.O.E. (3 mols) oleic acid monoester | " | " | CA-P.O.E. (3 mols) oleic acid monoester diester | 99.0 |
| 27 | HA | P.O.E. (2 mols) 2-octyldodecyl alcohol ether | " | " | HA-P.O.E.(2 mols)2-octyldodecyl ether diester | 99.0 |
| 28 | HA | P.O.E. (15 mols) 2-octyldodecyl alcohol ether | " | 0.19 | HA-P.O.E. (15 mols) 2-octyldodecyl ether diester | 98.7 |

Physical properties of the products

| Examples | Saponification value | Acid value | Specific gravity ($D_{20}^{30}$) | Coagulation point (°C.) | pH | H.L.B. |
|---|---|---|---|---|---|---|
| 18 | 113.00 | 2.50 | 0.93 | −15.0 | 6.1 | 2.6 |
| 19 | 89.50 | 2.00 | 0.97 | −3.0 | 5.9 | 6.1 |
| 20 | 66.09 | 2.80 | 1.02 | 10.3 | 5.8 | 9.6 |
| 21 | 66.95 | 3.10 | 1.01 | 17.4 | 6.0 | 8.9 |
| 2 | 107.26 | 1.03 | 0.92 | 5.8 | 6.2 | 2.6 |
| 22 | 87.67 | 1.23 | 1.00 | −5.0 | 6.5 | 5.6 |
| 23 | 66.95 | 2.50 | 1.01 | 15.4 | 6.2 | 8.9 |
| 24 | 48.0 | 2.34 | 1.03 | 25.0 | 6.0 | 11.2 |
| 25 | 102.42 | 2.01 | 0.94 | −5.0 | 6.1 | 3.7 |
| 3 | 168.58 | 0.12 | 0.98 | 2.0 | 6.3 | 2.8 |
| 26 | 160.31 | 3.20 | 0.98 | −1.5 | 5.8 | 4.8 |
| 27 | 97.50 | 2.75 | 0.90 | −5.0 | 5.7 | 1.4 |
| 28 | 48.87 | 3.15 | 1.01 | 24.0 | 5.7 | 10.4 |

Note:
LA; N-lauroyl-glutamic acid, CA; N-cocyl-glutamic acid, HA; N-hardened beef tallow fatty acid acyl glutamic acid, P.O.E.; polyoxyethylene, P.O.P.: polyoxypropylene, *$D_{20}^{70}$ Table 2

| N-long chain acylacidic aminoacid diester | Solubility at 40°C. in a concentration of 2.0% | | | | | |
|---|---|---|---|---|---|---|
| | Water | Propylene glycol | Ethyl Alcohol | Olive oil | Castor oil | Fluid paraffin |
| CA-2-hexyldecyl diester | I | I | S | S | S | S |
| CA-2-octyldodecyl diester | I | I | S | S | S | S |
| CA-isostearyl diester | I | I | S | S | S | S |

Table 2-continued

| N-long chain acylacidic aminoacid diester | Solubility at 40°C in a concentration of 2.0% | | | | | |
|---|---|---|---|---|---|---|
| | Water | Propylene glycol | Ethyl Alcohol | Olive oil | Castor oil | Fluid paraffin |
| CA-oleyl diester | I | I | S | S | S | S |
| CA-cetyl diester | I | I | S | S | S | S |
| CA-stearyl diester | I | I | S | S | S | S |
| CA-P.O.E. (2 mols) oleyl ether diester | D | I | S | S | S | S |
| CA-P.O.E. (3 mols) oleic acid monoester diester | D | I | S | S | S | S |
| CA-P.O.E. (2 mols) isostearic acid monoester diester | D | I | S | S | S | S |
| CA-P.O.E. (5 mols) oleyl ether diester | D | I | S | S | S | S |
| CA-P.O.P. (3 mols) oleyl ether diester | D | I | S | S | S | S |
| LA-2-hexyldecyl diester | I | I | S | S | S | S |
| LA-2-octyldodecyl diester | I | I | S | S | S | S |
| LA-isostearyl diester | I | I | S | S | S | S |
| HA-isostearyl diester | I | I | S | S | S | S |
| LA-oleyl diester | I | I | S | S | S | S |
| LA-stearyl diester | I | I | S | S | S | S |
| HA-2-octyldodecyl diester | I | I | S | S | S | S |
| CA-P.O.E. (2 mols) oleyl ether diester | D | I | S | S | S | S |
| CA-P.O.E. (5 mols) oleyl ether diester | D | I | S | S | S | S |
| CA-P.O.E. (10 mols) oleyl ether diester | D | I | S | S | S | S |
| CA-P.O.E. (15 mols) oleyl ether diester | S | I | S | S | S | S |
| LAA-P.O.E. (2 mols) oleyl ether diester | D | I | S | S | S | S |
| LAA-P.O.E. (5 mols) oleyl ether diester | D | I | S | S | S | S |
| LAA-P.O.E. (2 mols) cetyl ether diester | D | I | S | S | S | S |
| LAA-P.O.E. (15 mols) cetyl ether diester | S | I | S | S | S | S |
| LA-P.O.E. (2 mols) hexyldecyl ether diester | D | I | S | S | S | S |
| LA-P.O.E. (5 mols) hexyldecyl ether diester | D | I | S | S | S | S |
| LA-P.O.E. (10 mols) 2-hexyldecyl ether diester | D | I | S | S | S | S |
| LA-P.O.E. (15 mols) 2-hexyldecyl ether diester | S | I | S | S | S | S |
| LA-P.O.E. (20 mols) 2-hexyldecyl ether diester | S | I | S | S | S | S |
| HA-P.O.E. (2 mols) 2-octyldodecyl ether diester | D | I | S | S | S | S |
| LA-P.O.E. (5 mols) 2-octyldodecyl ether diester | D | I | S | S | S | S |
| LA-P.O.E. (10 mols) 2-octyldodecyl ether diester | D | I | S | S | S | S |
| HA-P.O.E. (15 mols) 2-octyldodecyl ether diester | S | I | S | S | S | S |
| LA-P.O.E. (2 mols) stearyl ether diester | D | I | S | S | S | S |
| LA-P.O.E. (5 mols) stearyl ether diester | D | I | S | S | S | S |
| HA-P.O.E. (2 mols) cetyl ether diester | D | I | S | S | S | S |
| HA-P.O.E. (5 mols) cetyl ether diester | D | I | S | S | S | S |
| HA-P.O.E. (2 mols) stearic acid monoester diester | D | I | S | S | S | S |
| HA-P.O.E. (10 mols) stearic acid monoester diester | D | I | S | S | S | S |
| HA-P.O.E. (3 mols) isostearic acid monoester diester | D | I | S | S | S | S |
| HA-P.O.E. (10 mols) isostearic acid monoester diester | D | I | S | S | S | S |
| LA-P.O.P. (5 mols) 2-octyldodecyl ether diester | D | I | S | S | S | S |
| LA-P.O.P. (10 mols) 2-hexyldecylether diester | D | I | S | S | S | S |

Note:
CA, LA, LAA, HA, P.O.E., and P.O.P. have the same meanings as shown in the footnote to Table 1.
I; insoluble, D; dispersible, S; soluble Table 3

Emulsifying Power

| N-long chain acyl-glutamic acid diesters | Amount of water separated (ml) |
|---|---|
| N-lauroyl-glutamic acid oleyl diester | 10.0 |
| N-lauroyl-glutamic acid cetyl diester | 10.0 |
| N-hardened beef tallow fatty acid acyl-2-octyldodecyl diester | 10.0 |
| N-lauroyl-glutamic acid P.O.E. (2 mols) oleyl ether diester | 6.5 |
| N-lauroyl-glutamic acid P.O.E. (5 mols) oleyl ether diester | 6.0 |
| N-lauroyl-glutamic acid P.O.E. (10 mols) oleyl ether diester | 4.0 |
| N-lauroyl-glutamic acid P.O.E. (15 mols) oleyl ether diester | 3.0 |
| N-lauroyl-glutamic acid P.O.E. (2 mols) 2-hexyldecyl ether diester | 7.0 |
| N-lauroyl-glutamic acid P.O.E. (5 mols) 2-hexyldecyl ether diester | 6.5 |
| N-lauroyl-glutamic acid P.O.E. (10 mols) 2-hexyldecyl ether diester | 5.0 |
| N-lauroyl-glutamic acid P.O.E. (2 mols) cetyl ether diester | 6.0 |
| N-lauroyl-glutamic acid P.O.E. (5 mols) cetyl ether diester | 5.5 |
| N-lauroyl-glutamic acid P.O.E. (10 mols) cetyl ether diester | 3.5 |
| N-hardened beef tallow fatty acid acyl-glutamic acid P.O.E. (2 mols) 2-octyldodecyl ether diester | 8.0 |
| N-hardened beef tallow fatty acid acyl-glutamic acid P.O.E. (5 mols) 2-octyldodecyl ether diester | 7.0 |
| N-hardened beef tallow fatty acid acyl-glutamic acid P.O.E. (15 mols) 2-octyldodecyl ether diester | 4.0 |
| N-lauroyl-aspartic acid P.O.E. (2 mols) oleyl ether diester | 6.0 |
| N-lauroyl-aspartic acid P.O.E. (10 mols) oleyl ether diester | 3.5 |

It is seen from table 3 that when the two ester portions of the N-long chain acylamino acid diesters of this invention do not contain polyoxyalkylene groups, the diesters do not have emulsifying power (the amount of the separated aqueous phase 10.0 ml.), and when containing polyoxyalkylene groups, the diesters exhibit emulsifying power. The emulsifying power becomes stronger with increasing number of the mols of the polyoxyalkylene groups added.

The following examples 29 to 37 illustrate the formulations of cosmetics containing the oil-soluble N-long chain acyl-acidic amino acid diesters of this invention.

EXAMPLE 29

Aerosol Hair-Dressing Cosmetics:-

|     |                                                                 | % by weight |
|-----|-----------------------------------------------------------------|-------------|
| (1) | N-coconut oil fatty acid acyl-L-glutamic acid isostearyl diester | 3.0 |
|     | Polyoxyethylene hardened castor oil triisostearate              | 4.7 |
|     | Polyoxyethylene hardened castor oil monoisostearate             | 4.0 |
| (2) | Propylene glycol                                                | 5.0 |
|     | Ethyl alcohol                                                   | 25.0 |
|     | Water (ion exchanged water)                                     | 58.0 |
| (3) | Perfume                                                         | 0.3 |
|     |                                                                 | 100% |

The composition (1) was heated to 40°C. and with good stirring, the perfume (3) was added. To the mixture was added the composition (2) held at 30°C. to form a solubilized base. Freon gas was incorporated in the base in an amount of about 20% based on the solubilized base to form a one-can transparent liquid (homogeneous liquid with no phase separation).

This product had the following properties.

1. The N-coconut oil fatty acid acyl-L-glutamic acid isostearyl diester produces a hair dressing effect and gives the hair a substantial feeling and luster.

2. Since it is a homogeneous Q. B. type, there is no likelihood of freson gas coming into the eyes or aspirating organs.

3. Since it is homogeneous, there is no unevenness in the smell of the perfume incorporated.

EXAMPLE 30

Aerosol hair rinse:-

|     |                                                                              |       |
|-----|------------------------------------------------------------------------------|-------|
| (1) | Liquid paraffin                                                              | 1.8%  |
|     | N-coconut oil fatty acid acyl-L-glutamic acid 2-octyldodecyl diester         | 0.35  |
|     | N-coconut oil fatty acid acyl-L-glutamic acid polyoxyethylene (2 mols) oleyl ether diester | 1.85  |
|     | Polyoxyethylene glycerol monoisostearate                                     | 0.6   |
| (2) | Polyethylene glycol                                                          | 0.2   |
|     | Fungicide                                                                    | 0.2   |
|     | Propylene glycol                                                             | 1.0   |
|     | Ethyl alcohol                                                                | 10.0  |
|     | Water (ion-exchanged water)                                                  | 83.8  |
| (3) | Perfume                                                                      | 0.2   |
|     |                                                                              | 100%  |

The composition (1) was heated to 40°C., and with good stirring, the perfume (3) was added. To the resulting mixture was added the composition (2) heated at 30°C. to form an emulsified base. Freon gas was incorporated into the base in an amount of about 10% based on the emulsified base to form a one-can soluble liquid in the milky white state.

This product had the following properties.

1. It is a one-can aerosol hair rinse since the dispersibility of freon gas is markedly improved by the N-long chain acyl-acidic amino acid ester even though the amount of water is more than 80%, and the amount of ethyl alcohol is as small as 10.0%.

2. Since it is a one-can liquid, it is not necessary to shake it before use.

EXAMPLE 31

Hair-dressing cosmetic:-

|     |                                                                        |       |
|-----|------------------------------------------------------------------------|-------|
| (1) | Lanolin alcohol                                                        | 29.3% |
|     | Vaseline                                                               | 19.5  |
|     | Carnauba wax                                                           | 2.5   |
|     | N-coconut oil fatty acid acyl-L-glutamic acid stearyl diester          | 23.5  |
|     | N-coconut oil fatty acid acyl-L-glutamic acid isostearyl diester       | 20.0  |
|     | Hardened castor oil                                                    | 2.7   |
|     | Sorbitan monooleate                                                    | 1.0   |
| (2) | Perfume                                                                | 1.5   |
|     |                                                                        | 100%  |

The components in (1) were mixed and stirred at 80° to 90°C., and the perfume (2) was added. The mixture was then molded by a molding device.

The hair dressing cosmetic obtained brings about good hair dressing effect by the addition of the diester and gives a substantial feeling and luster to the hair.

EXAMPLE 32

Hair cream:-

|     |                                                                               |       |
|-----|-------------------------------------------------------------------------------|-------|
| (1) | Liquid paraffin                                                               | 19.8% |
|     | Vaseline                                                                      | 10.0  |
|     | N-coconut oil fatty acid acyl-L glutamic acid 2-octyldodecyl diester          | 3.0   |
|     | N-coconut oil fatty acid acyl-L-glutamic acid cetyl diester                   | 1.0   |
|     | Lanolin alcohol                                                               | 2.0   |
|     | Polyoxyethylene stearyl alcohol ether                                         | 7.0   |
|     | Polyoxyethylene lauryl alcohol ether                                          | 0.5   |
| (2) | Polyethylene glycol                                                           | 0.25  |
|     | Sodium lauryl sulfate                                                         | 0.1   |
|     | Glycerine                                                                     | 1.0   |
|     | Sodium dehydroacetate                                                         | 0.05  |
|     | Water (ion-exchanged water)                                                   | 55.1  |
| (3) | Perfume                                                                       | 0.2   |
|     |                                                                               | 100%  |

The compositions (1) and (2) were separately heated to 80°C., and the perfume (3) was added to the composition (1). With stirring, the heated composition (2) was added to the mixture to form a glossy milky white strongly emulsified product.

EXAMPLE 33

Milky white lotion containing vitamin:-

|     |                                                                               |       |
|-----|-------------------------------------------------------------------------------|-------|
| (1) | Squalan                                                                       | 3.8%  |
|     | Vitamin E, acetic acid ester                                                  | 0.1   |
|     | N-coconut oil fatty acid acyl-L-Glutamic acid 2-octyldodecyl diester          | 0.3   |
|     | N-coconut oil fatty acid acyl-L-glutamic acid polyoxyethylene (2 mols) oleyl ether diester | 1.6   |
|     | Polyoxyethylene glycerol triisostearate                                       | 0.5   |
|     | Polyoxyethylene glycerol monoisostearate                                      | 0.25  |
| (2) | Polyethylene glycol                                                           | 0.2   |
|     | Disinfectant                                                                  | 0.1   |
|     | Propylene glycol                                                              | 2.0   |
|     | Ethyl alcohol                                                                 | 8.0   |
|     | Water (ion-exchanged water)                                                   | 82.95 |
| (3) | Perfume                                                                       | 0.2   |
|     |                                                                               | 100%  |

The composition (1) was heated to 40°C., and the perfume (3) was added. The resulting mixture was added to the composition (2) heated at 30°C. to form an emulsified product.

The product obtained is a milky white lotion comprising an alcohol-containing aqueous phase in which oil is uniformly dispersed. The lotion had extremely superior affinity with the skin and good spreadability as a result of adding the diester.

EXAMPLE 34 w/o type all-purpose cream having a large water content:-

| | | |
|---|---|---|
| (1) | Liquid paraffin | 10.0% |
| | Vaseline | 5.0 |
| | Lanolin alcohol | 1.3 |
| | N-coconut oil fatty acid acyl-L-glutamic acid stearyl diester | 4.0 |
| | N-coconut oil fatty acid acyl-L-glutamic acid polyoxyethylene (2 mols) oleyl ether diester | 4.7 |
| | Sorbitan monooleate | 2.0 |
| | Aluminium stearate | 1.0 |
| (2) | Glycerol | 2.0 |
| | Preservative | 0.05 |
| | Water (ion-exchanged water) | 69.65 |
| (3) | Perfume | 0.3 |
| | | 100% |

The composition (1) was heated to 75°C., and with good stirring, the perfume (3) was added. To the resulting mixture was added the composition (2) heated at 80°C.

According to the above recipe, there can be obtained an emulsion having superior spreadability, emollientness luster and milky whiteness as a result of using the diester as an oil-soluble surfactant.

EXAMPLE 35

Oil shampoo:-

| | | |
|---|---|---|
| (1) | N-lauroyl-L-glutamic acid mono-triethanolamine (20%) | 20.0% |
| | Polyoxyethylene alkylether sulfuric acid triethanolamine (30%) | 74.2 |
| | Hydroxypropyl cellulose | 1.0 |
| (2) | Lauric acid diethanolamide | 3.0 |
| | N-coconut oil fatty acid acyl-L-glutamic acid polyoxyethylene (2 mols) oleyl diester | 1.5 |
| (3) | Perfume | 0.3 |
| | | 100% |

The composition (2) was homogeneously dissolved at 70°C., and the perfume (3) was added to it. To the resulting mixture was added the composition (1) dissolved uniformly at 70°C. They were mixed with stirring while being cooled with ice.

The product obtained had good bubbling and bubble stability as a result of adding the diester, and the substantial feeling and combability of the hair after rinsing proved satisfactory.

EXAMPLE 36

Face-washing cream (foamable):

| | | |
|---|---|---|
| (1) | Liquid paraffin | 0.95% |
| | Ethylene glycol disearate | 1.9 |
| | Stearic acid | 6.0 |
| | Myristic acid | 25.0 |
| | Polyoxyethylene stearyl ether | 0.75 |
| | Polyoxyethylene lauryl ether | 1.5 |
| | Propylene glycol | 4.3 |
| (2) | Potassium hydroxide | 6.0 |
| | Water (ion-exchanged water) | 47.3 |
| | Sodium laurylsulfate | 2.8 |
| (3) | N-coconut oil fatty acid acyl-L-glutamic acid polyoxyethylene (2 mols) oleyl ether diester | 3.0 |
| | Perfume | 0.5 |
| | | 100% |

The compositions (1) and (2) were separately heated to 85°C., and then mixed together with stirring. After sufficient saponification, the perfume (3) heated at 40°C. was added to the mixture, followed by cooling with water with stirring.

According to the recipe of this example, there can be obtained a face washing cream having luster, good milky whiteness, and very good foamability as a result of adding the diester.

EXAMPLE 37

Foundation cream:-

| | | |
|---|---|---|
| (1) | Liquid paraffin | 10.3% |
| | Bees wax | 3.0 |
| | Spermaceti wax | 3.0 |
| | Lanolin alcohol | 1.7 |
| | N-lauroyl-glutamic acid polyoxyethylene (2 mols) oleyl ether diester | 4.0 |
| | Polyoxyethylene stearyl ether | 2.0 |
| | Sorbitan monooleate | 1.0 |
| | Aluminium stearate | 1.5 |
| | Pigment (titanium oxide:liquid paraffin = 1 : 1) | 16.0 |
| (2) | Propylene glycol | 2.0 |
| | Sodium 2-pyrrolidone-5-carboxylate | 2.0 |
| | Preservative | suitable amount |
| | Water (ion-exchanged water) | 53.5 |
| (3) | Perfume | suitable amount |
| | | 100% |

The components of (1) above were mixed with good stirring to disperse the aluminum stearate and pigment uniformly in the oil phase. Then, with stirring, the mixture was heated to 110° to 120°C., and with continued stirring, the mixture was cooled to 70°C. With stirring, the cooled mixture was added to the composition (2) heated at 75°C., The perfume (3) was added at 50°C.

The product of this example is a foundation cream having good spreadability, stickability, emolientness and feeling of use as a result of superior w/o emulsion formability of the N-lauroyl glutamic acid polyoxyethylene (2 mols) oleyl ether diesters.

According to the same recipe as above except that N-lauroyl-glutamic acid oleyl alcohol diester was added instead of the N-lauroyl-glutamic acid polyoxyethylene (2 mols) oleyl ether diester (A), a foundation cream (B) was prepared. Using each of the creams (A) and (B), a sensual test was conducted on a panel of 40 adults consisting of 20 men and 20 women both ranging from 18 to 25 in age. The results are shown in table 4 below.

Table 4

| Samples | Spreadability | | Stickability | | Feeling of Use | |
|---|---|---|---|---|---|---|
| | Men | Women | Men | Women | Men | Women |
| A | 15 | 19 | 14 | 17 | 18 | 20 |
| B | 5 | 1 | 6 | 3 | 2 | 0 |

The figures show the number of persons who estimated the respective properties as best.

Cream A shows good results in all of the properties tested.

The emulsion stability with the passage of time of each of the above samples was tested, and the results are shown in table 5 below.

Table 5

| Period Sample | Emulsion stability at 40°C. after passage of the periods indicated. | | | |
|---|---|---|---|---|
| | One day | One week | One month | Two months |
| A | Good | Good | Good | Good |
| B | Fair | Poor | Poor | Poor |

The results were evaluated on a scale of good, fair, and poor, in which "good" denotes good emulsion stability, "fair" shows that slight phase separation is observed, and "poor" shows that phase separation coccurs and the emulsion exhibits degradation.

It is seen from the above results, that sample A has good emulsion stability, while sample B has poor stability.

As is demonstrated by the above tests, the N-lauroyl glutamic acid polyoxyethylene (2 mols) oleyl ether diester exerts favorable effects on the product in not only emulsion stability but also spreadability, stickability and feeling of use as compared with the N-lauroyl acyl-glutamic acid oleyl alcohol diester.

What we claim is:

1. An N-long chain acyl-acidic amino acid diester expressed by the general formula

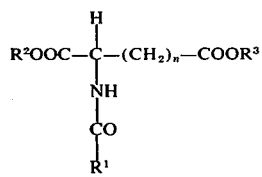

wherein $R^1CO-$ consists essentially of a residue of a straight-chain or branched-chain saturated or unsaturated aliphatic acid having 7 to 21 carbon atoms; $R^2O$ and $R^3O$ consist essentially of (1) a residue of a straight-chain or branched-chain saturated or unsaturated aliphatic alcohol having 8 to 30 carbon atoms, (2) a residue of a polyoxyalkylene higher alcohol ether composed of a straight-chain or branched-chain saturated or unsaturated monohydric alcohol having 8 to 30 carbon atoms and a polyoxyalkylene containing 1 to 20 oxyalkylene units with 2 to 4 carbon atoms, or (3) residue of a polyoxyalkylene higher fatty acid ester composed of a straight-chain or branched-chain saturated or unsaturated monovalent aliphatic acid and a polyoxyalkylene containing 1 to 20 polyoxyalkylene units with 2 to 4 carbon atoms; and $n$ is 1 or 2.

2. N-lauroyl-glutamic acid cetyl diester.
3. N-lauroyl-glutamic acid 2-hexyldecyl diester.
4. N-lauroyl-glutamic acid 2-octyldodecyl diester.
5. N-lauroyl-glutamic acid stearyl diester.
6. N-lauroyl-glutamic acid polyoxyethylene (10 mols) oleyl ether diester.
7. N-lauroyl-glutamic acid polyoxyethylene (2 mols) cetyl ether diester.
8. N-lauroyl-glutamic acid polyoxyethylene (5 mols) cetyl ether diester.
9. N-lauroyl-glutamic acid polyoxyethylene (2 mols) stearyl ether diester.
10. N-lauroyl-glutamic acid polyoxyethylene (5 mols) stearyl ether diester.
11. N-lauroyl-glutamic acid polyoxyethylene (2 mols) 2-hexyldecyl ether diester.
12. N-lauroyl-glutamic acid polyoxyethylene (5 mols) 2-hexyldecyl ether diester.
13. N-lauroyl-glutamic acid polyoxyethylene (10 mols) 2-hexyldecyl ether diester.
14. N-coconut oil fatty acid acyl-glutamic acid 2-hexyldecyl diester.
15. N-coconut oil fatty acid acyl-glutamic acid 2-octyldodecyl diester.
16. N-coconut oil fatty acid acyl-glutamic acid isostearyl diester.
17. N-coconut oil fatty acid acyl-glutamic acid oleyl diester.
18. N-coconut oil fatty acid acyl-glutamic acid cetyl diester.
19. N-coconut oil fatty acid acyl-glutamic acid stearyl diester.
20. N-coconut oil fatty acid acyl-glutamic acid polyoxyethylene (2 mols) oleyl ether diester.
21. N-coconut oil fatty acid acyl-glutamic acid polyoxyethylene (5 mols) oleyl ether diester.
22. N-coconut oil fatty acid acyl-glutamic acid polyoxyethylene (10 mols) oleyl ether diester.
23. N-coconut oil fatty acid acyl-glutamic acid polyoxyethylene (15 mols) oleyl ether diester.
24. N-coconut oil fatty acid acyl-glutamic acid polyoxypropylene (3 mols) oleyl ether diester.
25. N-coconut oil fatty acid acyl-glutamic acid polyoxyethylene (3 mols) oleic acid monoester diester.
26. N-hardened beef tallow fatty acid acyl-glutamic acid polyoxyethylene (2 mols) 2-octyldodecyl ether diester.
27. N-hardened beef tallow fatty acid acyl-glutamic acid polyoxyethylene (15 mols) 2-octyldodecyl ether diester.
28. N-hardened beef tallow fatty acid acyl-glutamic acid isostearyl diester.

* * * * *